US00RE42123E

(19) United States
(12) Reissued Patent
Enriquez et al.

(10) Patent Number: US RE42,123 E
(45) Date of Reissued Patent: *Feb. 8, 2011

(54) PROGRAMMABLE SUBSCRIBER LINE CIRCUIT PARTITIONED INTO HIGH VOLTAGE INTERFACE AND DIGITAL CONTROL SUBSECTIONS

(75) Inventors: Leonel Ernesto Enriquez, Melbourne Beach, FL (US); Douglas Lawton Youngblood, Palm Bay, FL (US); Edward Berrios, Scottsdale, AZ (US)

(73) Assignee: Intersil Americas Inc., Milpitas, CA (US)

( * ) Notice: This patent is subject to a terminal disclaimer.

(21) Appl. No.: 12/169,457
(22) Filed: Jul. 8, 2008

Related U.S. Patent Documents

Reissue of:
(64) Patent No.: 7,260,214
Issued: Aug. 21, 2007
Appl. No.: 11/295,901
Filed: Dec. 7, 2005

U.S. Applications:
(62) Division of application No. 10/091,976, filed on Mar. 6, 2002, now Pat. No. 7,050,577.

(51) Int. Cl.
*H04M 1/00* (2006.01)
*H04M 9/00* (2006.01)

(52) U.S. Cl. ..... 379/413; 379/395.01

(58) Field of Classification Search ..... 379/413, 379/395.01
See application file for complete search history.

(56) References Cited

U.S. PATENT DOCUMENTS

| | | | |
|---|---|---|---|
| 4,315,106 | A | 2/1982 | Chea, Jr. |
| 4,317,963 | A | 3/1982 | Chea, Jr. |
| 5,323,461 | A | 6/1994 | Rosenbaum et al. |
| 5,528,688 | A | 6/1996 | Schorr |
| 5,737,411 | A | 4/1998 | Apfel et al. |
| 6,243,399 | B1 | 6/2001 | Kaewell et al. |
| 6,453,040 | B1 | 9/2002 | Burke et al. |
| 6,735,302 | B1 | 5/2004 | Caine et al. |

*Primary Examiner*—Alexander Jamal
(74) *Attorney, Agent, or Firm*—Fogg & Powers LLC

(57) ABSTRACT

A subscriber line interface circuit has a battery-powered, high voltage analog section, that drives tip and ring lines of a subscriber loop, and a mixed signal (low voltage and digital signal processing) section, that monitors and controls the high voltage analog section. An input signal receiving unit of the high voltage analog section conditions input voice and low voltage signaling and ringing signals from the mixed signal section, for application to a dual mode, programmable gain, tip/ring amplifier coupled to the loop. A sense amplifier at the output of the tip/ring amplifier is through an auxiliary amplifier to an analog feedback monitor port for closing a loop to synthesize the circuit's output impedance.

37 Claims, 4 Drawing Sheets

PROGRAMMABLE SUBSCRIBER LINE CIRCUIT PARTITIONED INTO HIGH VOLTAGE INTERFACE AND DIGITAL CONTROL SUBSECTIONS

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation application of U.S. patent application Ser. No. 10/091,976 filed on Mar. 6, 2002, now U.S. Pat. No. 7,050,577 by Enriquez et al, entitled "Programmable Subscriber Line Circuit Partitioned Into High Voltage Interface And Digital Control Subsections", assigned to the assignee of the present application, and the disclosure of which is incorporated herein.

FIELD OF THE INVENTION

The present invention relates in general to telecommunication systems and subsystems therefor, and is particularly directed to a new and improved subscriber line interface circuit (SLIC), whose operational parameters are made programmable and power requirements of which are substantially reduced, by partitioning the SLIC into respective high voltage interface and low voltage, digital control subsections.

BACKGROUND OF THE INVENTION

Subscriber line interface circuits (SLICs) are employed by telecommunication service providers to interface a communication wireline pair with subscriber (voice—data) communication equipment. In order to be able to be interfaced with a variety of telecommunication circuits including low voltage circuits providing digital codec functionality, the transmission channels of the SLIC must conform with a very demanding set of performance requirements, including but not necessarily limited to accuracy, linearity, low noise, filtering, insensitivity to common mode signals, low power consumption, and ease of impedance matching programmability, Moreover, in a typical application, the length of the wireline pair to which a SLIC is connected can be expected to vary from installation to installation, and may have a significant length (e.g., on the order of multiple miles), transporting both substantial DC voltages, as well as AC signals (e.g., voice and/or ringing). As a result, it has been difficult to realize a SLIC implementation that has 'universal' use in both legacy and state of the art installations.

SUMMARY OF THE INVENTION

In accordance with the present invention, this objective is successfully realized by means of a new and improved 'partitioned' SLIC architecture, containing a high voltage analog section, that drives tip and ring conductors of a respective subscriber loop pair, and an associated mixed signal (low voltage and digital signal processing) section, that monitors and controls the operation of the high voltage analog section. On-hook signaling, such as on-hook idle, on-hook transmission, tip-open ground start, and ringing, and off-hook signaling (e.g., voice transmission) are supported, as will be described.

The high voltage section of the SLIC control inputs from the mixed signal section are coupled to a control latch interface unit, that contains a set of input latches and associated output drive circuits. The use of latched control parameters enables independent control of multiple channels with a minimal number of control lines. The control inputs are used to selectively define multiple bias conditions or disable functional blocks of the high voltage section based upon requirements for a given mode of operation.

In addition to voice signaling, the high voltage section is configured to provide a substantial gain boost for low voltage signals, and to provide both balanced and unbalanced drives for ringing, including multiple wave shapes, such as sinusoidal and trapezoidal signals. The high voltage section is also configured to supply advanced diagnostic information, for application to the low voltage digital signal processing interface. Diagnostic information may relate to tip and ring currents, and operating battery voltage.

The mixed signal section contains low voltage digital communication interface circuitry, including a digital signal processor (DSP) based coder-decoder (codec). Because the mixed signal section is digitally programmable, the partitioned SLIC architecture of the invention is, in effect, a 'universal' design, that may be readily programmed to comply with a variety of industry and country telecommunication standards. Programmable line circuit parameters include loop supervision, loop feed, impedance matching and test coverage.

Within the high voltage analog section, a receive input unit interfaces and conditions input voice and ancillary signals, including DC voltage settings and ringing signals, supplied from the codec. The receive input unit's voice signal path contains a voltage-sense, current-feed circuit to which voice signals are coupled from the mixed signal codec. A voice voltage signal applied across a sense resistor coupled to a reference voltage terminal produces a current representative of the applied voice signal. Complementary polarity copies of this current are regenerated by tip and ring associated current sources and applied to signal inputs of respective tip and ring amplifier blocks of a dual mode tip/ring amplifier unit. Signal inputs to the tip/ring amplifier unit are also switchably coupled to receive currents from respective tip- and ring-associated DC/RING current generators used for DC voltage setting and ringing signaling defined by tip and ring voltage control signals applied to respective tip voltage control (TVC) and ring voltage control (RVC) inputs. By driving these inputs with appropriate AC and DC voltage levels, the codec is able to provide independent control of signaling parameters of the SLIC as presented to its subscriber loop side tip and ring ports, including selecting balanced, unbalanced, or offset ringing.

Each tip and ring portion of the dual mode tip/ring amplifier unit is selectively biased to place tip and ring at specified DC voltages, depending upon the mode of operation. For example, each tip and ring portion may have a first, relatively low gain (close-to-unity e.g., G=1 or 1.4) for a first, noise minimization signaling mode (on-hook signaling (e.g., caller ID) and off-hook voice signaling), and an increased or high gain for a second signaling mode (e.g., G=30 for DC biasing of tip/ring, and G=120 for ringing and testing). For this purpose, each tip and ring portion contains a pair of front end transconductance circuits sections coupled to a shared operational amplifier unity gain section. Respectively different valued feedback resistors from the output of the unity gain section to the two front end sections are used for different gain requirements among the signaling modes. The front end section to which the lower valued feedback resistor is coupled is used for voice signal and low voltage signal processing, while the other front end section to which the larger valued feedback resistor is coupled is used for ringing. The unity gain stages of the tip/ring amplifier are coupled through respective current sense resistors to tip and ring output terminals for the subscriber loop, and are further coupled to a terminating loopback unit through which the tip and ring terminals may be selectively terminated by a resistor having a prescribed loop resistance (e.g., 600 ohms).

Reference voltages for the tip/ring amplifier are derived via a battery bias unit, from a battery supply switch unit. The battery bias unit contains a set of switchable voltage divider networks, that are used to selectively bias tip and ring portions of the tip/ring amplifier in accordance with the mode of operation of the SLIC. The battery supply switch provides for the selection of either a high battery voltage VBH (e.g., on the order of −60 to −125 VDC) or a low battery voltage VBL (e.g., on the order of −16 to −50 VDC). This selective battery capability supports advanced signaling techniques such as Type 2 Caller ID.

To enable the mixed signal section to monitor the battery voltage, a copy of the current drawing through tip/ring voltage divider networks of the battery bias unit from the battery supply switch is replicated by a current source within a battery monitor unit and applied through a monitor resistor. The resulting voltage drop across the battery voltage monitor resistor is proportional to the battery voltage VBAT being coupled through battery supply switch unit and is coupled to a battery voltage monitor port.

In addition to being coupled to the subscriber loop and the terminating loopback unit, the tip/ring amplifier is coupled to a sense amplifier and to a tip and ring current sense unit. The sense amplifier contains a pair of voltage detectors coupled in series through a resistor to a sense output port. Parametric values of the sense amplifier resistor and those of the tip/ring amplifier current sense resistors are selected so that they effectively match one another to yield a precise output current at the sense amplifier output as a response to the sense amplifier's voltage detector circuit.

The voltages across the tip and ring sense resistors of the tip/ring amplifier block are complementary-polarity coupled to the series-coupled voltage detectors, so that the sense amplifier will provide a voice signal summation for differential mode voice signals, whereas common mode signals will mutually cancel one another. The output of the current sense amplifier is adapted to be capacitor-coupled through an external amplifier to an analog feedback monitor port for closing a loop to synthesize the output impedance. The tip and ring current sense unit contains respective tip and ring path loop detectors, that provide scaled versions of sensed tip and ring currents for application via tip and ring current monitoring ports of a diagnostic port unit to the mixed signal codec subsection.

The outputs of the tip and ring amplifiers are also subject to a transient current limiter which constrains the current drive capability of the tip and ring amplifiers until DC feed parameters are established by the codec. This current limiting feature is used to prevent the flow of potentially significant currents in the subscriber loop, when the phone goes off hook in idle or ringing states, or when a fault condition occurs.

DETAILED DESCRIPTION

Figure 1:
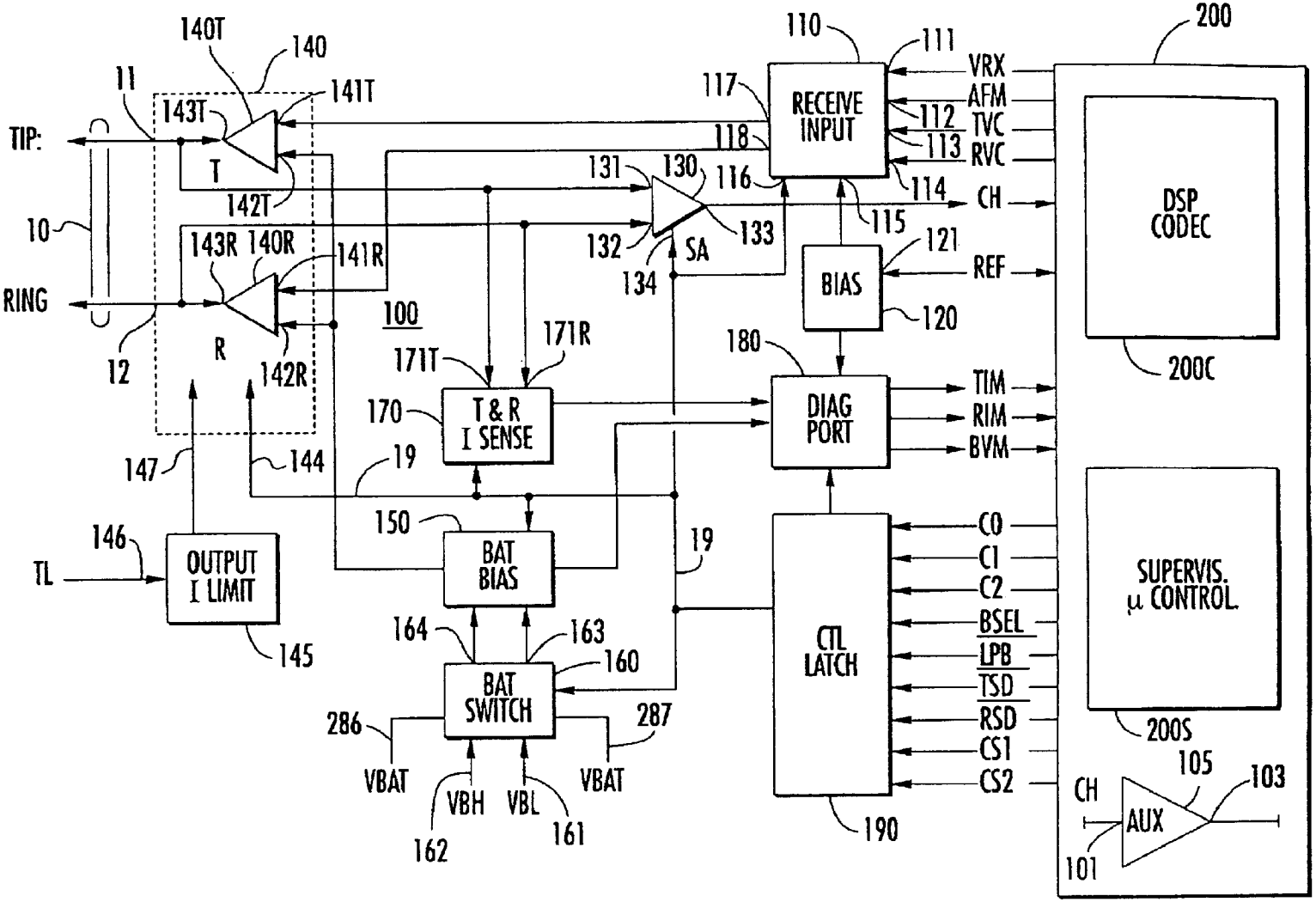
FIG. 1 diagrammatically illustrates the overall architecture of the partitioned subscriber line interface circuit in accordance with the present invention.

The overall architecture of the new and improved subscriber line interface circuit in accordance with the present invention is diagrammatically illustrated in the block diagram of FIG. 1 as comprising a main, high voltage analog section 100 and an associated mixed signal (low voltage and digital) section 200. In order to reduce the complexity of the drawings, the high voltage analog section of a single channel is shown. However, it is to be understood that the partitioning of the SLIC architecture in accordance with the present invention allows multiple high voltage analog sections associated with multiple telecommunication channels to be integrated in the same architecture with a shared mixed signal section, to improve semiconductor area occupancy efficiency of the fabricated device. In a practical implementation, a pair of high voltage sections may be coupled to and controlled by a common mixed signal section, so as to provide for dual channel SLIC functionality in the same semiconductor circuit.

The high voltage analog section 100 has no intelligence of its own, but is configured to perform analog (voice, ringing, etc.) signal processing and interface functions of a conventional SLIC, based upon control inputs and programmed parameters of the mixed signal section 200. On the subscriber loop side, the high voltage analog section 100 is configured to be interfaced via tip and ring ports 11 and 12 with respective tip and ring conductors of an associated twisted conductor pair 10. On its mixed signal interface side, the high voltage analog section 100 is configured to be interfaced with a DSP codec subsection 200C and a supervisory microcontroller subsection 200S of the mixed signal section 200.

The DSP codec subsection 200C of the mixed signal section 200 may be implemented using a commercially available DSP codec, such as, but not limited to, a Texas Instruments advanced DSP codec; the supervisory microcontroller subsection 200S may comprise a conventional microprocessor and associated memory, and is programmable to establish parameters and control the operation of the high voltage section, as will be described.

The high voltage analog section 100 is comprised of an integrated arrangement of functional analog signal blocks or units, parameters for which are digitally programmable and the operations of which are monitored by the mixed signal section, as will be described. A first of these functional signal blocks of the high voltage analog section 100 is a receive input unit 110. As will be described in detail below, the receive input unit 110 serves to interface and condition voice signals and associated ancillary signals, such as ringing signals, coupled thereto from the DSP codec subsection 200C of the mixed signal section 200.

For this purpose, the receive input unit 110 has an input or voice signal receiving port 111, that is adapted to be interfaced with voice signals VRX supplied by the codec. A reference bias voltage for the receive input unit 110 is coupled to a reference port 115 thereof by a bias unit 120, having an input port 121 coupled to receive a reference voltage REF from the codec. The reference voltage REF is selected in accordance with the available voltage parameters of the circuit and may lie at a midpoint between Vcc and ground. For reduced voltage circuit applications, such as those operating at value on the order of three volts, the reference voltage REF may correspond to a voltage on the order of 1.5 VDC. The receive input unit 110 has a bias current supply port 116 coupled to a bias current supply bus 19 through which respective bias currents are supplied from a control and latch interface unit 190.

The control and latch interface unit 190 comprises a set of input latches and associated output drive circuits, through which respective values of bias currents are defined by the supervisory microcontroller subsection 200S, for application to various ones of the functional blocks or units of the high voltage section 100, as will be described. The use of latched control parameters enables independent control of multiple channels with a minimal number of control lines. A respective channel of a dual channel architecture has a dedicated chip select input (CS1 or CS2) that performs the latch function in accordance with the binary value (0/1) of the latch input.

The control inputs (C0, C1, C2, BSEL, LPB, TSD and RSD) are used to selectively set multiple bias conditions or disable functional blocks based upon their operating requirements for a given mode of operation. The inputs C0, C1 and C2 are operating mode control inputs; BSEL defines which battery supply (VBH or VBL) will be provided by a battery supply switch; LPB connects an internal two-wire load (600 ohm resistor 271 within a tip and ring current sense unit 170) across tip and ring; TSD is used to set the tip amplifier output to high impedance; and RSD is used to set the ring amplifier output to high impedance.

The receive input unit 110 further includes an analog feedback monitor (AFM) port 112, that may be used to close an amplifier loop from the output 133 of a sense amplifier (SA) 130 through an output CH port 133 to an auxiliary/external amplifier, to synthesize the output impedance of a dual mode tip and ring amplifier unit 140. A bias current (ibsa) for the sense amplifier 130 is coupled to a bias current supply port 134 from the bias current supply bus 19, while the tip/ring amplifier unit 140 has a bias current supply port 144 coupled to the bias current supply bus 19. The receive input unit 110 further includes a pair of Tip Voltage Control (TVC) and Ring Voltage control (RVC) inputs 113 and 114, respectively, through which the controller provides independent control of signaling parameters of the SLIC as presented to the tip and ring ports 11 and 12. Driving these inputs with appropriate AC and DC voltage levels enables the user to select balanced, unbalanced, or offset ringing.

On its output side, the receive input unit 110 has a tip output port 117 coupled to a signal input port 141T of a tip amplifier 140T, and a ring output port 118 coupled to a signal input port 141R of a ring amplifier 140R within the dual mode tip/ring amplifier unit 140. The tip amplifier 140T has a bias reference input port 142T, while the ring tip amplifier 140R has a bias reference port 142R. These reference ports are coupled via a battery bias unit 150 to a battery supply switch unit 160, to which respective high and low battery voltages VBH and VBL are coupled.

As will be detailed below, the battery bias unit 150 contains a set of selectively controlled voltage divider networks, that are used to selectively bias the tip and ring amplifiers 140T and 140R, to operate as close-to-unity gain amplifiers for a first signal mode, such as voice signal processing and caller ID, or as increased or 'boosted' gain amplifiers for a second signal mode, such as ancillary (e.g., on-hook) signal processing (e.g., ringing,) and other non-signalling modes.

The battery supply switch 160 provides for the selection of either the high battery voltage VBH or low battery voltage VBL, and is independent of operating mode. (As a non-limiting example, the low battery voltage VBL may be on the order of −50 VDC or less and the high battery voltage VBH may be on the order of −125 VDC or less.) This flexibility supports advanced signaling techniques such as Type 2 Caller ID. In the course of changing operating states, the battery switch is preferably operated prior to or simultaneously with the device mode/state change to minimize duration and power of off-hook transients. The high battery voltage VBH may be enabled for line test, ringing and on-hook modes, to provide MTU compliance at the two wire interface.

The tip amplifier 140T has its output port 143T coupled to the tip port 11, while the ring amplifier 140R has its output port 143R coupled to the ring port 12. In addition, tip amplifier output port 143T is coupled to a first input 131 of sense amplifier 130 and to tip current sense input port 171T of a tip and ring current sense unit 170. Similarly, the ring amplifier output port 143R is coupled to a second input 132 of sense amplifier 130 and to a ring current sense input port 171R of the tip and ring current sense unit 170. As will be described, the tip and ring current sense unit 170 contains respective tip and ring path loop detectors, that are used to provide scaled versions of sensed tip and ring currents for application via tip and ring current monitoring ports TIM and RIM of a diagnostic port unit 180 to mixed signal controller 200S subsection.

Also coupled with the outputs of the tip and ring amplifiers 140T and 140R of the dual mode tip and ring amplifier unit 140 is a transient current limiter unit 145, which is operative to limit the current drive capability of the tip and ring amplifiers until DC feed parameters are established by the codec. This current limiting feature is used to limit potentially significant currents, such as those in excess of several hundred milliamps, which can flow in the subscriber loop, when the phone goes off hook in idle or ringing states, or when a fault condition occurs. To this end, the current limiting unit 145 has a transient current limit TL input 146, to which an external resistor referenced to ground is coupled in order to program the current limit threshold. Details of the manner in which the output 147 of the current limiting unit 145 is used to limit the current in the circuitry of the tip and ring amplifiers will be described below.

Figure 2:
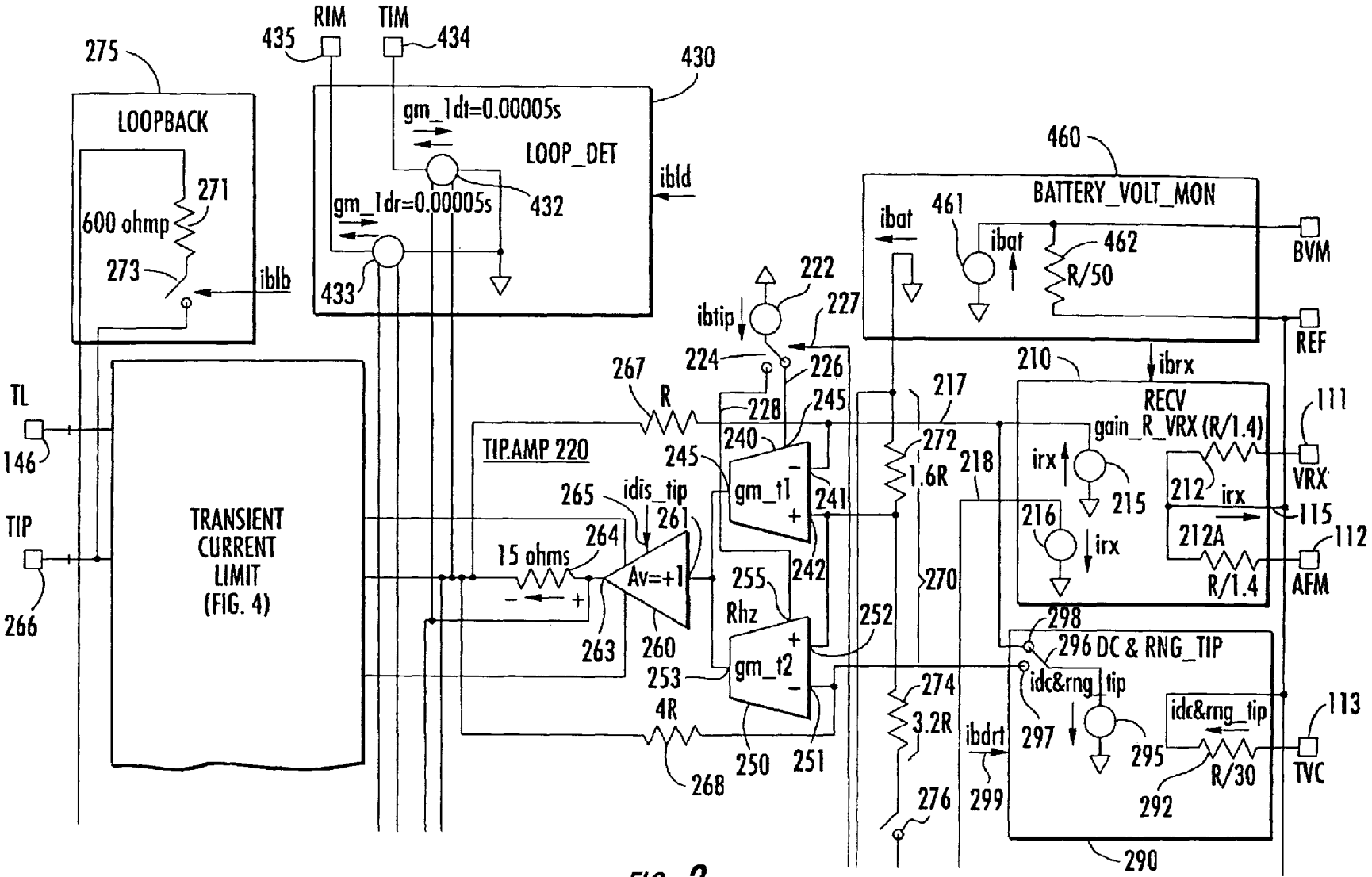
FIGS. 2 and 3 show circuit details of the high voltage analog section of the SLIC architecture of FIG. 1.
Figure 3:
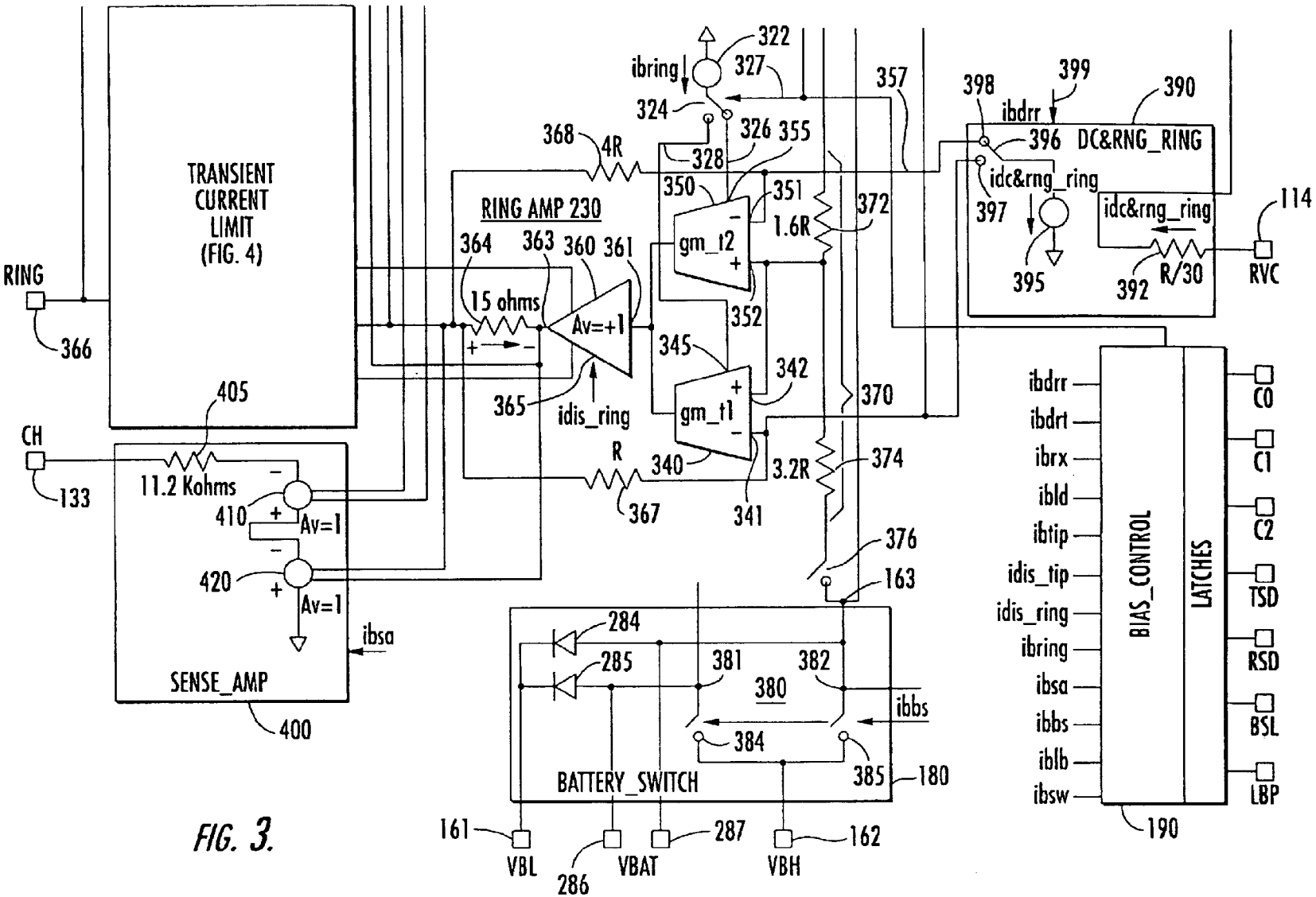

Attention is now directed to FIGS. 2 and 3, which show the circuit details of the high voltage analog section 100 of the SLIC functional block architecture of FIG. 1, described above.

Receive Input Unit 110; BIAS Unit 120

The receive input (input signal receiving) unit 110 includes a voice signal receiver block 210, shown in FIG. 2 as a voltage-sense, current-feed circuit, coupled to the voice signal receiving port 111, to which voice signals VRX supplied from the mixed signal codec subsection 200C are applied. The input port 111 of voice signal receiver block 210 is coupled through a sense resistor 212 (shown as having a resistor value R/1.4) to the reference port 115, to which the reference voltage REF is supplied from the codec via the bias unit 120, as described above. In response to a voice representative voltage signal applied across the voice signal receiving port 111 and the reference voltage terminal 115, sense resistor 212 produces a received current irx representative of the applied voice signal.

Complementary polarity copies of this current irx are regenerated by a pair of (tip and ring associated) current sources 215 and 216 (which may be implemented as current mirrors), and applied over signal lines 217 and 218 to respective tip and ring amplifier blocks 220 and 230 of the dual mode tip and ring amplifier unit 140. A bias current ibrx for enabling operation of the current sources 215 and 216 of the voice signal receiver block 210 is supplied from the bias current bus 19, described above. Signal lines 217 and 218 are also switchably coupled to receive currents from respective tip- and ring-associated DC/RING current generators 290 and 390, described below.

In addition to its voice signal receiving port 111 and associate sense resistor 212, the voice signal receiver block 210 has an auxiliary sense resistor 212A coupled between the voltage reference port 115 and the analog feedback monitor (AFM) port 112. As pointed out above, the AFM port 112 provides the ability to close a loop from the output 133 of the sense amplifier 130 through an external amplifier, in order to synthesize the output impedance of the tip and ring amplifier blocks 220/230.

Sense Amplifier 130

The sense amplifier 130 is shown as comprising a pair of voltage detectors 410 and 420 coupled in series through a resistor 405 (which may have a value on the order of 11.2 kohms, as a non-limiting example) between a CH output port 133 and GND. A bias current ibsa for the voltage detectors of the sense amplifier 130 is supplied by control and latch interface unit 190. The parametric values of the sense amplifier resistor 405 and those of tip and ring amplifier blocks' sense resistors 264 and 364 (to be described) are selected so that they effectively match one another in the sense of the output transfer function of the tip and ring amplifiers as coupled to the sense amplifier's voltage detector circuitry. Since the voltages across the tip and ring sense resistors of the tip/ring amplifier block are coupled in complementary-polarity fashion to the series-coupled voltage detectors 410 and 420, the sense amplifier's output port 133 will provide a voice signal summation output for differential mode voice signals, whereas common mode signals will mutually cancel one another. As shown in FIG. 1, the sense amplifier's output port CH may be AC (capacitor) coupled to an auxiliary circuit, such as to the inverting input 101 of an external operational amplifier 105, the output 103 of which may be fed back to the AFM port 112. As pointed out above, coupling the output of the sense amplifier 400 through an external amplifier to the AFM port enables the AFM port to provide a synthesized output impedance of the tip and ring amplifiers. The external amplifier also serves as a precise current to voltage converter, which feeds voice band signals into the codec section 200S Tip/Ring Amplifier Unit 140

As described briefly above, each tip and ring dual mode amplifier block 220/230 of the dual mode, tip and ring amplifier unit 140 is selectively biased to place tip and ring at specified DC voltages, in accordance with the mode of operation of the SLIC. For example, each tip and ring portion of this tip/ring amplifier unit may be biased to have a first, relatively low gain (close-to-unity e.g., G=1 or 1.4) for a first, noise minimization signaling mode (on-hook signaling (e.g., caller ID) and off-hook voice signaling), and an increased or high gain for a second signaling mode (e.g., G=30 for DC biasing of tip/ring, and G=120 for ringing and testing). The tip amplifier block 220 is preferably configured of bipolar transistor components, having first and second front end transconductance circuits sections 240 and 250, outputs of which are coupled to a shared operational amplifier unity gain section 260. Likewise, the ring amplifier block 230 has front end transconductance circuits sections 340 and 350, whose outputs are coupled to a shared operational amplifier unity gain section 360.

Within the tip amplifier block 220, the front end gain section 240 is used for voice signal processing, while its companion front end gain section 250 is used for ancillary signalling. Under processor control, one of the two front end sections 240 and 250 is selectively enabled by the application of an enabling bias current ibtip from a tip bias current source 222, that mirrors a current ibtip supplied by the control and latch interface 190. The output of the tip bias current source 222 is selectively coupled through a switch 224 to one of a pair of bias current supply lines 226 and 228, respectively feeding bias current input terminals 245 and 255 of the front end sections 240 and 250. The path through bias current supply switch 224 is controlled by a processor-sourced control signal ibsw supplied over link 227 from the control latch interface 190.

The tip path's voice signal front end section 240 has an inverting (−) input 241 coupled to the signal line 217, through which the above-referenced voice signal current irx is supplied, and a non-inverting input 242, that is coupled to receive a prescribed battery supply-based, reference bias voltage from the battery bias unit 150. The output 243 of the tip amplifier's front end section 240 is coupled to input 261 of the unity gain stage 260. For the parameters of the present example, the effective gain through the voice signal transmission path section 240 of the dual mode, tip amplifier block 220 is a close-to-unity value of R/R/1.4 or 1.4.

The ancillary signal mode front end section 250 of the tip amplifier block 220 has an inverting (−) input 251 coupled to a DC/RING line 297, through which an ancillary current idc&mg_tip is supplied from a tip associated DC/RING current generator circuit 290 (described below) within the receive input block 110, and a non-inverting input 252 coupled via the tip path voltage divider network 270 to the battery supply switch 160. The ancillary signal mode front end section 250 also has its output 253 coupled to the input 261 of the unity gain stage 260. In response to a Tip Voltage Control signal TVC applied across the TVC input port 113 and the reference voltage terminal 115, the sense resistor 292 produces a DC/RING current idc°_tip. This current idc°_tip is regenerated by current source 295 and applied via one of the paths through a switch 296 to either the voice signal line 217 or the DC/RING signal line 297. For the parameters of the present example, the effective gain of the ancillary signal path of tip amplifier block 220 is 4R/R/30 or 120.

The unity gain stage 260 of the tip amplifier block 220 has its output 263 coupled through a current sense resistor 264 (which may have a relatively small value on the order of 15 ohms, as a non-limiting example) to a TIP output port 266. TIP port 266 and an associated RING port 366 at the output of the ring amplifier block 230 are coupled to the tip and ring current sense unit 170, through which the respective TIP and RING outputs 143T and 143R of the tip and ring amplifier unit 140 may be selectively terminated (via a switch 273 operated by a loopback current line iblb) across a resistor 271 having a prescribed loop resistance (e.g., 600 ohms) of a loopback circuit 275.

Under processor control, the tip amplifier gain stage 260 is selectively enabled by the application of an enabling bias current idis_tip supplied to an enable input 265. The gain of the voice signal section of the dual mode, tip amplifier block 220 is defined by the ratio of a feedback resistor 267 (shown as having a resistor value R) coupled between the connection of the TIP port 266 and the inverting input 241 of the front end section 240.

For on-hook, low voltage operation (e.g., caller ID signalling), the gain of tip amplifier through the front end section is defined by the ratio of the feedback resistor 267 to a front end sense resistor 292 (shown as having a value of R/30) within the tip associated DC/RING current generator circuit 290, to produce a boost or gain (e.g., 1×30=30) for a relatively small value (on the order of a volt or so) signal applied to TVC input port 113 of the receive input block 110. The current through the input resistor 212 of the voice signal receiver block 210 is mirrored by the current source 215, which is coupled to the inverting (−) input 241 of the tip amplifier's front end section 240. Accordingly, the effective gain of the voice path section of the dual mode, tip amplifier block is R/R/1.4 or 1.4. Bias current for a current source 295 is supplied by a bias input line 299 providing bias current ibdrt from control and latch interface 190.

For ringing operation, the gain of the dual mode, tip amplifier block 220 is defined by the (larger valued) ancillary path feedback resistor 268 (shown as having a resistor value 4R) coupled between the connection of the TIP port 266 and the inverting (−) input 251 of the front end section 250. Namely, this relatively larger gain value is used in combination with front end resistor 292 (shown as having a value of R/30) within the tip associated DC/RING current generator circuit 290, to produce a very large boost or gain (e.g., 4×30=120) of a ringing signal waveform applied to TVC port 113.

The ring amplifier block 230 is configured identically to the tip amplifier block 220, described above, having a pair of front end transconductance circuits sections 340 and 350, outputs of which are coupled to the shared unity gain section 360. Front end gain section 340 is used for (off-hook and on-hook) voice signal processing, while front end gain section 350 is used in the ancillary (on-hook, ringing) state. Under processor control, one of the two front end sections 340 and 350 of the ring amplifier block 230 is selectively enabled by the application of an enabling bias current ibring supplied by a ring bias current source 322, which mirrors a current ibring supplied by control and latch interface 190.

The bias current ibring from the ring bias current source 322 is selectively coupled through a switch 324 to one of a pair of bias current supply lines 326 and 328 feeding bias current input terminals 345 and 355 of the respective front end ring amplifier sections 340 and 350. The path through bias current supply switch 324 is controlled by the control signal ibsw from control latch interface 190.

The ring path voice signal mode section 340 has an inverting (−) input 341 coupled to the complementary polarity voice current signal line 218, through which the complementary polarity copy of the voice signal current irx is supplied, and a non-inverting input 342 coupled via ring voltage divider network 370 of the battery bias unit 150 to the battery supply switch 160. As with the tip path, the ring path voltage divider network 370 is used to selectively scale the battery voltage provided by the battery supply switch unit 160 to an appropriate reference level for the enabled one of the two front end gain sections 340/350 of the dual mode ring amplifier 330. The ring path voice signal mode section 340 is coupled to input 361 of unity gain stage 360.

The ring signal path's ancillary signal mode front end section 350 has an inverting (−) input 351 coupled to a DC/RING signal line 357, through which an ancillary current idc&rng_ring is supplied from a ring associated DC/RING current generator circuit 390, and a non-inverting input 352 coupled via the ring path voltage divider network 370 to the battery supply switch unit 160. The ancillary signal mode front end section 350 has its output 353 coupled to the input 361 of the unity gain stage 360. The unity gain stage 360 has its output 363 coupled through a current sense resistor 364 to a RING output port 366. Under processor control, the ring amplifier gain stage 360 is selectively enabled by the application of an enabling bias current idis_ring supplied to an enable input 365 by control and latch interface 190.

The gain of the voice signal section of the dual mode, ring amplifier block 230 is defined by a feedback resistor 367 (shown as having a resistor value R) coupled between the connection of the RING port 366 and the inverting (−) input 341 of the front end section 340. As described above, in the present example, the effective gain of the voice path section of the dual mode, ring amplifier block 230 is R/R/1.4 or 1.4.

For DC voltage setting, the gain of ring amplifier through the front end section 340 is defined by the ratio of feedback resistor 367 to a front end sense resistor 392 (shown as having a value of R/30) within the ring path associated DC/RING current generator circuit 390, to produce a boost or gain of 1×30=30 for a relatively small value (on the order of a volt) signal applied to RVC port 114.

Similar to the tip path for ringing mode signalling, the gain of the dual mode, ring amplifier block 230 is defined by the ancillary path feedback resistor 368 (shown as having a resistor value 4R) coupled between the connection of the RING port 366 and the inverting (−) input 351 of the front end section 350. As pointed out above in connection with the tip signal path, this larger gain value is used in combination with a front end sense resistor 392 (shown as having a value of R/30) within the ring associated DC/RING current generator circuit 390, to produce a very large gain for the value of a ringing signal applied to RVC port 114. Bias current for a current source 395 is supplied by a bias input line 399 providing a bias current ibdrr supplied by control and latch interface 190.

Thus, for a ringing signal applied across the RVC port 114 and the reference voltage terminal 115, the sense resistor 392 produces a DC/RING current idc&rng_ring, which is regenerated by the current source 395 and applied via path 398 through a switch 396 to the ring path DC/RING signal line 357. As described above, for the parameters of the present example, the effective gain of the ancillary signal path of ring amplifier block 230 is 4R/R/30 or 120.

Output Current Limit Unit 145

Figure 4:
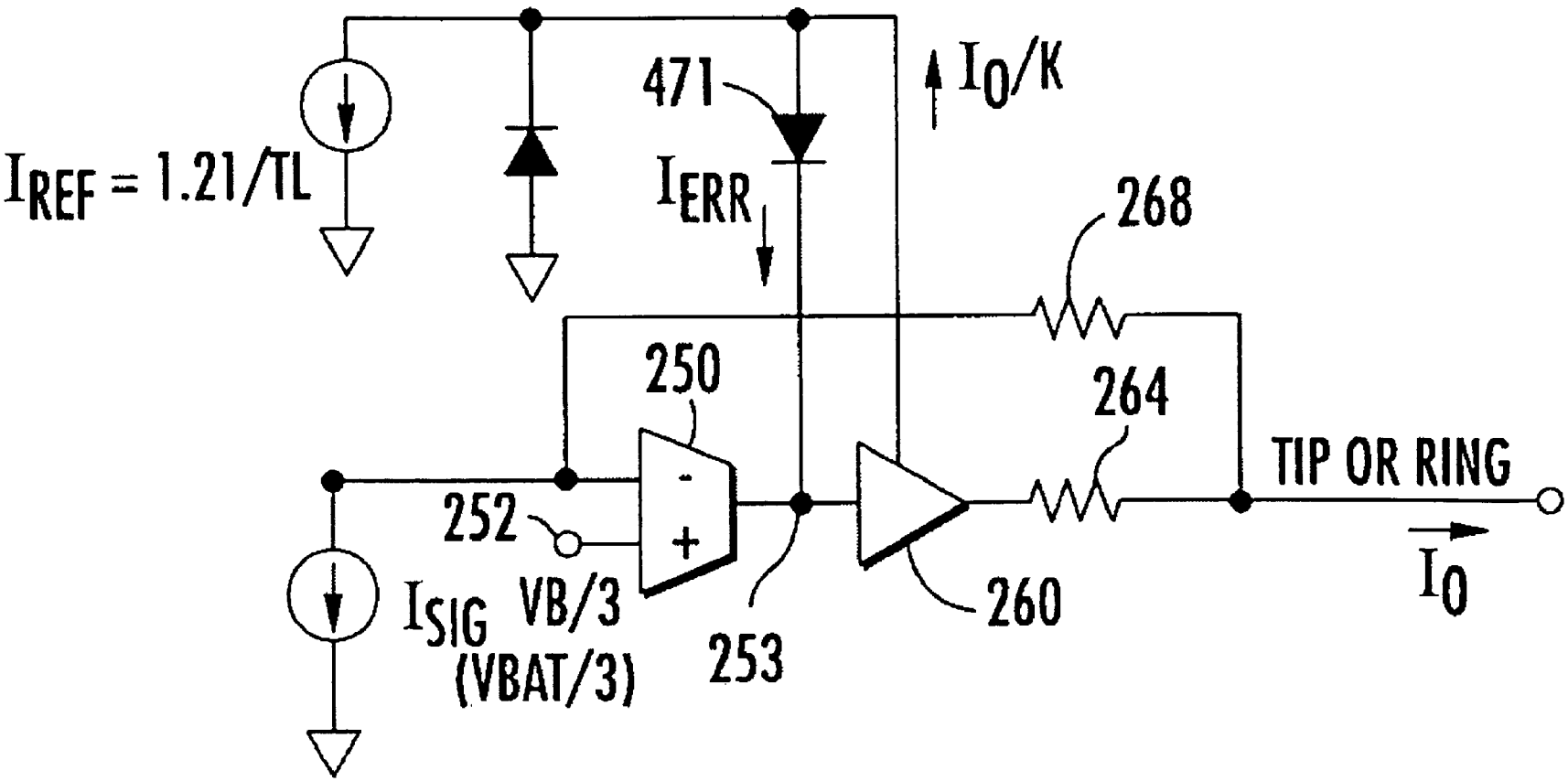
FIG. 4 is a schematic diagram of current limiting circuitry through the tip path front end section and gain stage of the tip/ring amplifier in the SLIC of FIGS. 1-3.

As described above, the current drive capability of the tip and ring amplifiers is limited by the DC feed transient current limiter unit 145, until DC feed parameters are established by the mixed signal controller subsection 200S, so as to prevent potentially significant currents, such as those in excess of several hundred milliamps, from flowing in the subscriber loop when the phone goes off hook in idle or ringing states, or when a fault condition occurs. The manner in which this is accomplished for the case of limiting source current is shown in FIG. 4, which is a partial schematic diagram of the tip path through tip path front end section 250 and gain stage 260. A similar diagram applies to the sink current limit with a corresponding change in current polarity. It should be noted that the same mechanism is employed in the ring path amplifier.

For normal operation, an error current $I_{ERR}$ through a diode 471 which couples the output 253 of front end stage 250 and a reference current $I_{REF}$ is zero. In this state, the output voltage is determined by the signal current $I_{SIG}$ multiplied by the value $R_F$ of the feedback resistor 268. With the current polarity as shown for $I_{SIG}$, the output voltage moves positive with respect to VB/3 (or VBAT/3). Assuming that the amplifier output is driving a load at a more negative potential, then the amplifier output will source current.

During an excessive output source current flow, the scaled output current Io/K will exceed the reference current $I_{REF}$, forcing the flow of error current $I_{ERR}$. The error current will be subtracted from the signal current, to reduce the amplifier output voltage. By reducing the output voltage, the sourced current to the load is also reduced, and the output current is limited.

Battery BIAS Unit 150

The battery bias unit 150 comprises a pair of tip and ring voltage divider networks 270 and 370, that are used to selectively scale the battery voltage supplied by the battery supply switch 160 to appropriate reference levels for the front end gain sections of the dual mode tip and ring amplifiers. For this purpose, the tip voltage divider 270 includes a first resistor 272 (shown as having a value 1.6R), which is coupled to input 242 of tip amplifier front end 240 and input 252 of tip amplifier front end 250. Resistor 272 is coupled in series with a second resistor 274 (shown as having a value 3.2R), which is coupled through a tip network switch 276 to the battery supply switch output port 163. Similarly, on the ring side, the ring voltage divider 370 includes a first resistor 372 (having a value 1.6R), which is coupled to input 342 of ring amplifier front end 340 and input 352 of ring amplifier front end 350. Resistor 372 is coupled in series with a second resistor 374 (having a value 3.2R), which is coupled through a ring network switch 376 to the battery output port 163.

When the tip network switch 276 is open, the tip voltage divider network 270 is isolated from the battery supply switch 160, so that ground (GND) is coupled through resistor 272 to inputs 242, 252 of the tip amplifier front ends 240, 250. In addition, when switch 276 is open the tip amplifier is maintained in a reduced power dissipation condition. On the other hand, when the tip network switch 276 is closed, the tip voltage divider 270 applies one-third of the battery voltage (VBAT/3, which has a value of either VBL/3 or VBH/3)) to inputs 242, 252 of the tip amplifier front ends 240, 250.

Similarly, when the ring network switch 376 is open, the ring voltage divider 370 is isolated from the battery supply switch 160, and ground (GND) is coupled through resistor 272 to inputs 342, 352 of the ring amplifier front ends 340, 350. In addition, when switch 376 is open the ring amplifier is maintained in a reduced power dissipation condition. Conversely, when the ring network switch 376 is closed, the ring voltage divider 370 applies a voltage on the order of one-third of the battery voltage (VBAT/3) to inputs 342, 352 of the ring amplifier front ends 340, 350 (ignoring the diode drops of diodes 284 and 285) in the battery supply switch. The use of one-third battery voltage value (VBAT/3) optimizes power consumption and overhead drive. In addition, dividers 270 and 370 provide power for driving a companion circuit.

This ability to selectively control DC voltage settings enables the SLIC to minimize power during on-hook modes, while being maintained in a 'ready to go' condition, in anticipation of the user going off-hook, and be ready for transmission. As described above, the reference voltage REF is supplied by the codec and the signals applied to the TVC and RVC inputs vary above and below this value. Thus, when the input voltage is more positive than the reference, current will flow from the two-wire interface to the inverting input of the feed amplifier, driving the tip or ring terminal positive with respect to VBAT/3. On the other hand, if the input voltage is more negative than the reference voltage, current will flow into the two-wire interface to the inverting input of the feed amplifier, driving the tip or ring terminal negative with respect to −VBAT/3.

Therefore, for the high gain mode described above, the voltages $V_{TIP}$ and $V_{RING}$ at the tip and ring terminals may be defined respectively as:

$$V_{TIP}=(V_{TVC}-V_{REF})\times 120-|(V_{BAT}-0.9)/3|$$

$$V_{RING}=(V_{RVC}-V_{REF})\times 120-|(V_{BAT}-0.9)/3|$$

Similarly, for low gain mode:

$$V_{TIP}=(V_{TVC}-V_{REF})\times 30-|(V_{BAT}-0.9)/3|$$

$$V_{RING}=(V_{RVC}-V_{REF})\times 30-|(V_{BAT}-0.9)/0.3|$$

The value of 0.9 in the above equations reflects the voltage drop of an internal blocking diode.

Battery Supply Switch Unit 160

The battery supply switch 160, to which the battery bias unit 150 is coupled, is used to selectively couple one of a relatively low battery voltage VBL applied to battery supply switch input port 161, and a relatively high battery voltage VBH applied to battery supply switch input port 162, to an output port 163. (As pointed out above, the low battery voltage VBL may be on the order of −50 VDC or less and the high battery voltage VBH may be on the order of −125 VDC or less.) The battery supply switch output port 163 is switchably coupled to each of tip path voltage divider network 270 and ring path voltage divider network 370 within the battery bias unit 150. The choice of which battery voltage is to be supplied depends upon the state of battery supply switch unit 160 whose operation is controlled by a control current ibbs from control and latch interface 190.

For this purpose, the low battery voltage VBL port 161 is coupled through respective diodes 284, 285 to nodes 381, 382 of a double-pole, single-throw switch 380. Diodes 284, 285 allow transitioning to low battery operation, in the event the high battery is removed. Switch 380 is controlled by the battery supply switch control signal ibbs. Nodes 381, 382 of the switch 380 are further coupled to respective battery monitoring nodes 286 and 287, and to various circuits of the SLIC. Node 286 may be coupled to power transistor circuits, while node 287 may be coupled to circuits other than power transistor circuits. Normally open nodes 384 and 385 are coupled in common to the high battery voltage VBH port 162.

To monitor the battery voltage, a copy of the current ibat drawn through the tip/ring voltage divider networks from the battery supply switch output terminal 163 is replicated by a current source 461 within a battery monitor unit 460 of the diagnostic port unit 180 and applied through a monitor resistor 462 (having a resistor value of R/50) to the reference voltage terminal REF. The resulting voltage drop across the battery voltage monitor resistor 462, is proportional to the battery voltage VBAT being coupled through battery supply switch unit 160. This voltage is coupled to a battery voltage monitor port BVM.

Tip and Ring Current Sense Unit 170

As pointed out above, the unity gain stage 260 of the tip amplifier block 220 has its output 263 coupled through a current sense resistor 264 to the TIP output port 266, and the unity gain stage 360 of the ring amplifier block 230 has its output 363 coupled through a current sense resistor 364 to RING output port 366. In order to monitor the voltages across these sense resistors, each resistor is coupled to a loop detector 430 within the tip and ring current sense unit 170.

In particular, the tip path sense resistor 264 is coupled to a tip path voltage detector circuit 432, the output of which is coupled to tip current monitoring (TIM) port 434. Likewise, the ring path sense resistor 364 is coupled to a ring path voltage detector circuit 433, the output of which is coupled to a ring current monitoring (RIM) port 435. Each of these voltage detector circuits provides a scaled version of the sensed current through the TIM and RIM ports diagnostic port unit 180 to the front end digital-to-analog converter for the processor 200S. A loop detector bias current ibid for the voltage detectors of the loop detector 430 is supplied by control and latch interface 190. The TIM and RIM ports may be coupled to external resistors (not shown), voltage drops across which are monitored by the codec to control/adjust the Tip Voltage Control signal TVC applied to the tip side input port 291, and the Ring Voltage Control signal RVC applied to the ring side input port 391. This ability to make adjustments in response to monitoring the loop current provides for software control of a variety of functions, such as loop current-limiting, switch hook, ground key, and ring trip threshold settings.

Operating Modes

On-Hook

The present invention supports on-hook idle, on-hook transmission, tip-open ground start, and ringing.

On-Hook Idle

During this mode, there is no AC transmission, to minimize power, and MTU voltage compliance is achieved by applying prescribed voltage conditions to the tip and ring input ports TVC and RVC.

On-Hook Transmission

In this mode, data transmission is conducted while the subscriber is on-hook. This is typically employed for caller ID transmission during the last silent portion of the ringing cadence. As in the on-hook idle mode, MTU voltage compliance is achieved by applying prescribed voltage conditions to the tip and ring input ports TVC and RVC. Polarity reversal may be readily accomplished by reversing the voltage conditions of the TVC and RVC inputs.

Tip Open Ground Start

This mode is employed for ground start signaling, customarily used in private branch exchange (PBX) applications, to minimize conflicts between incoming and outgoing line seizures. This is the idle state for the line circuit that interfaces with the PBX such as a central office or network interface unit (NIU). In this mode, the tip amplifier output is forced to a high impedance state. Line supervision (for ground key detection) is performed by monitoring the TIM and RIM ports for the occurrence of an imbalance in tip and ring currents when the ring terminal is grounded.

Ringing

As described above, the invention provides balanced and unbalanced drives for ringing, and supports multiple wave shapes, such as sinusoidal and trapezoidal signals, with a relatively high gain (120V/V). To establish the DC voltage on the tip and ring terminals, the codec subsection 200C applies appropriate voltages to the TVC/RVC inputs, as described above. Except for unbalanced ringing, the ringing signals applied to the TVC/RVC inputs are superimposed on the DC voltage and 180° out of phase.

For balanced ringing, each of the tip and ring terminals is driven to one-half the high battery voltage (−VBH/2). For unbalanced ringing, the ringing input to the TVC input is disabled, and the tip terminal is driven close to ground, while the ring terminal is driven to −VBH/2. Since only one terminal drives the ringer load, power to the load is halved. Offset ringing is accomplished by offsetting the terminal voltages equally from VBH/2.

The maximum signal swing of a respective tip/ring amplifier is defined by the ringing battery voltage and the amplifier overhead requirements. As a non-limiting example, for a 2.5 V overhead, and a maximum ringing battery voltage of −120V, the tip and ring amplifiers will swing from −2.5V to −117.5V, producing a differential ringing voltage at the tip and ring terminals of 230 Vpp.

Off-Hook Signalling

When operating in off-hook mode, the line voltage is set to steady state levels necessary to maintain constant current feed by the line circuit. The tip and ring input's are configured for a gain of 30 in this operating mode. Forward and reverse loop feed are achieved by reversing the voltage conditions of the TVC and RVC inputs.

When an off-hook event is detected, the codec initiates a programmable DC loop feed algorithm. Tip and ring may be displaced symmetrically relative to approximately VBAT/3 to limit the current, or asymmetrically. The tip and ring terminals are initially driven to open circuit/anti saturation voltages for the application. The metallic current information provided by the TIM/RIM outputs is compared with a current limit threshold, as described previously.

If the loop current is excessive, the tip to ring voltage is reduced. When the threshold is reached, the tip to ring voltage is fixed and a programmable loop current hysteresis or low-pass filter function is executed to provide loop stability during voice transmission.

Voice Signal Transmission 4-2 Wire Gain

During AC transmission, the DSP codec 200C is coupled to terminal CH through an auxiliary amplifier which provides the precision current to voltage conversion required by the A/D converter in the codec voice path. In this mode the tip/ring amplifier converts the received voice signal voltage from the codec into a differential signal at the tip/ring interface. The sense amplifier's output at terminal CH provides the codec with a very precise current that is proportional to the AC loop current. This current is converted to a voltage and fed to the codec for processing, being injected back into the receive path to produced a 4-2 wire gain of 1.4 from the injection point to the two-wire interface. As pointed out above, the output of external amplifier 105 configured with appropriate gain can be connected to the AFM terminals for hardwire impedance synthesis, resulting in a gain of 1.4V/V from the receive input to tip and ring.

2 Wire-4 Wire Gain

For two-wire to four-wire voice transmission, the voltages across the tip and ring sense resistors of the tip/ring amplifier block 140 are coupled in complementary-polarity fashion to the series-coupled voltage detectors 410 and 420, so that output port 133 of sense amplifier 130 will provide a voice signal summation output for differential mode voice signals, whereas common mode signals will mutually cancel one another. As pointed out above, the sense amplifier's output port CH may be AC-coupled to an auxiliary circuit, such as inverting input 101 of external operational amplifier 105, the output of which may be fed back to the AFM port 112, to synthesize the output impedance of the tip and ring amplifier portions. The values of the sense amplifier resistor and the resistors of the tip and ring amplifier blocks are selected to effectively match one another, so as to achieve a precise output transfer function.

As will be appreciated from the foregoing description, by partitioning the signal processing functionality of a subscriber line interface circuit into high voltage interface and low voltage, digital control subsections, the present invention is able to realize a SLIC architecture whose operational characteristics, including voice, signaling and ringing, as well as line circuit parameters include loop supervision, loop feed, impedance matching and test coverage, which are readily digitally programmable and whose power requirements are reduced relative to conventional SLIC architectures having fixed operational characteristics. This effectively makes the SLIC architecture of the invention a 'universal' design, being readily programmed to comply with a variety of industry and country telecommunication standards.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A subscriber line interface circuit, comprising:

a high voltage analog section, containing analog circuits including tip and ring amplifiers driving tip and ring conductors, respectively having operational parameters thereof established in accordance with respective programmable bias currents supplied thereto by programmable bias current sources coupled to said analog circuits, and to which power sufficient for any signaling conditions of said tip and ring conductors of a respective subscriber loop pair is supplied, and being operative to drive said tip and ring conductors of said respective subscriber loop pair in accordance with analog input and analog control signals supplied thereto; and a low voltage, digitally programmable signal generation and digital signal processing section comprising a DSP-based CODEC and a programmable supervisory digital controller;

tip and ring sensing circuitry coupled to said tip and ring amplifiers for sensing operational characteristics of said tip and ring amplifiers, respectively, a feedback connector coupling said tip and ring sensing circuitry to said programmable supervisory digital controller to permit said programmable supervisory digital controller to monitor said operational characteristics;

wherein said DSP-based CODEC is operative to interface voice and ancillary signals including low voltage signaling and ringing signals with said analog circuits of said high voltage analog section, and said programmable digital controller is operable, to program values of said respective programmable bias currents supplied by said programmable bias current sources, so as to establish said operational parameters of respective ones of said analog circuits of said high voltage analog section.

2. The subscriber line interface circuit according to claim 1, wherein said high voltage analog section is configured to receive and store, from said supervisory digital signal processor, digital input signals for defining values of said respective programmable bias currents supplied by said programmable bias current sources, and through which said operational parameters of said respective ones of said analog circuits of said high voltage analog section are established.

3. The subscriber line interface circuit according to claim 1, wherein said high voltage analog section includes an input signal receiving unit, that is operative to interface and condition said voice and ancillary signals as supplied from said DSP-based CODEC of said low voltage, digitally programmable signal generation and digital signal processing section.

4. The subscriber line interface circuit according to claim 3, wherein said input signal receiving unit includes a voice signal path containing a voltage-sense, current-feed circuit, to which said voice signals are coupled from said DSP-based CODEC, and a tip/ring amplifier unit, having respective tip and ring amplifier sections, to which complementary polarity currents representative of voice signals are coupled from said voltage-sense, current-feed circuit, and having tip and ring outputs thereof arranged to be coupled to said tip and ring conductors of said respective subscriber loop pair.

5. The subscriber line interface circuit according to claim 4, wherein each of said tip and ring amplifier sections of said tip/ring amplifier unit is configured for multiple mode operation, and having respectively different gain characteristics which are programmable in accordance with the intended mode of operation of said subscriber line interface circuit, as controlled by said supervisory digital signal processor.

6. The subscriber line interface circuit according to claim 5, wherein said input signal receiving unit includes respective ancillary tip and ring signal paths containing respective tip and ring associated voltage-sense, current-feed circuits, to which ancillary tip and ring signals are coupled from said DSP-based CODEC.

7. The subscriber line interface circuit according to claim 6, wherein each of said tip and ring amplifier sections of said tip/ring amplifier unit is configured to operate, under control of said supervisory digital signal processor, at a first gain for voice signal transmission mode, and at a second gain, substantially increased relative to said first gain, for ancillary signal transmission mode.

8. The subscriber line interface circuit according to claim 7, wherein each of said tip and ring amplifier sections contains a plurality of front end transconductance circuits coupled to a shared operational amplifier gain section, and having feedback resistors coupled from an output of said shared operational amplifier gain section to inputs of respective ones of said plurality of front end transconductance circuits, that define respectively different gain characteristics with input resistors associated with drive signal currents from said input signal receiving unit, as defined by signals from said supervisory digital signal processor.

9. The subscriber line interface circuit according to claim 8, wherein said plurality of front end transconductance circuits include a first front end transconductance circuit, having a first valued feedback resistor coupled from said output of said shared operational amplifier gain section to a signal input of said first front end transconductance circuit, and a second front end transconductance circuit, having a second valued feedback resistor, different from said first valued feedback resistor, coupled from said output of said shared operational amplifier gain section to a signal input of said second front end transconductance circuit, and wherein said signal input of said first front end transconductance circuit is arranged to receive a selected one of said voice signals and said ancillary signals, and wherein said signal input of said second front end transconductance circuit is arranged to receive a low voltage ringing signal.

10. The subscriber line interface circuit according to claim 9, wherein said first front end transconductance circuit is coupled to receive one of voice signals and low voltage signals, and said second front end transconductance circuit is coupled to receive ringing signals.

11. The subscriber line interface circuit according to claim 5, wherein said high voltage analog section further includes a battery bias unit, that is operative to couple bias voltages to voltage reference inputs of said tip and ring amplifier sections of said tip/ring amplifier unit, said bias voltages having values which are selected in accordance with the mode of operation of said subscriber line interface circuit.

12. The subscriber line interface circuit according to claim 11, wherein said battery bias unit is coupled to a battery supply switch unit that is operative to provide for the selection of said bias voltages from among a plurality of different battery voltages.

13. The subscriber line interface circuit according to claim 12, wherein said battery bias unit contains a set of switchable voltage divider networks, coupled between said voltage reference inputs of said tip and ring amplifier sections of said tip/ring amplifier unit, and wherein said battery supply switch unit is operative to selectively couple either a high battery voltage VBH or a low battery voltage VBL to said battery bias unit.

14. The subscriber line interface circuit according to claim 13, further including a battery monitor unit coupled to provide said supervisory digital signal processor with an indication of the battery voltage being selectively coupled to said battery bias unit by said battery supply switch unit.

15. The subscriber line interface circuit according to claim 5, further including a sense amplifier, coupled to outputs of said tip and ring amplifier sections of said tip/ring amplifier unit, and being operative to provide a voice signal summation for differential mode voice signals, and mutual cancellation of common mode signals.

16. The subscriber line interface circuit according to claim 15, wherein an output of said sense amplifier is arranged to be coupled through an auxiliary amplifier to an analog feedback monitor port for closing a loop to synthesize the output impedance of said subscriber line interface circuit.

17. The subscriber line interface circuit according to claim 15, wherein said sense amplifier comprises tip and ring associated voltage detectors, complementary-polarity coupled across tip and ring sense resistors, at outputs of said tip and ring amplifier sections of said tip/ring amplifier unit.

18. The subscriber line interface circuit according to claim 5, wherein said tip and ring amplifier sections of said tip/ring amplifier unit are coupled to respective tip and ring path loop detectors, that provide outputs representative of sensed tip and ring currents for application to said supervisory digital signal processor.

19. The subscriber line interface circuit according to claim 5, wherein said tip and ring amplifier sections of said tip/ring amplifier unit are operative to controllably limit transient current therein.

20. The subscriber line interface circuit according to claim 3, wherein said high voltage analog section includes a tip/ring amplifier unit, having tip and ring outputs that are arranged to be coupled to respective ones of said tip and ring conductors of said respective subscriber loop pair, and having gain characteristics which are programmable in accordance with the intended mode of operation of said subscriber line interface circuit, as established by said respective programmable bias currents supplied by said programmable bias current sources, and programmed by said supervisory digital signal processor.

21. The subscriber line interface circuit according to claim 20, wherein said input signal receiving unit includes respective ancillary tip and ring paths containing respective tip and ring associated voltage-sense, current-feed circuits, to which ancillary tip and ring control voltages are supplied, so as to place said tip/ring amplifier unit at respectively different gains, for respectively different modes of operation of said subscriber line interface circuit.

22. The subscriber line interface circuit according to claim 21, wherein said respective ancillary tip and ring paths and said tip/ring amplifier unit are configured to place said tip/ring amplifier unit at said respectively different gains for respectively different on-hook and off-hook modes of operation of said subscriber line interface circuit.

23. The subscriber line interface circuit according to claim 4, wherein said tip/ring amplifier unit is coupled to controllably supply said tip and ring conductors with respectively different sets of DC voltages, in accordance with the intended mode of operation of said subscriber line interface circuit, as established by said respective programmable bias currents programmed by said supervisory digital signal processor.

24. The subscriber line interface circuit according to claim 4, wherein said programmable supervisory digital controller comprises a microprocessor.

*25. A subscriber line interface circuit comprising:*

*a high voltage analog section, containing analog operational circuits, operational parameters of which are programmable in accordance with respective bias currents supplied thereto, and to which power sufficient for any signaling conditions of tip and ring conductors of a respective subscriber loop pair is supplied, and being operative to drive said tip and ring conductors of said respective subscriber loop pair in accordance with analog input and analog control signals supplied thereto; and*

*a mixed signal section that is operative to interface voice and ancillary signals with said analog circuits of said high voltage analog section and to program respective values of said bias currents that control operational parameters of respective ones of said analog operational circuits, said bias currents being coupled to said analog operational circuits and thereby establishing said programmable operational parameters thereof;*

*wherein said high voltage section includes a control and latch interface unit that is operative to receive and store, from said mixed signal section, a plurality of digital input signals for defining values of said bias currents through which said operational parameters of said respective ones of said analog operational circuits of said high voltage section are established.*

*26. The subscriber line interface circuit of claim 25, wherein the mixed signal section comprises a CODEC that is operative to interface said voice and ancillary signals with said analog circuits of said high voltage analog section.*

*27. The subscriber line interface circuit of claim 26, wherein the CODEC is a digital signal processor (DSP) based CODEC.*

*28. The subscriber line interface circuit of claim 26, wherein the mixed signal section comprises a supervisory digital signal processor, separate from said CODEC, that is operative to program respective values of bias currents that control operational parameters of respective ones of said analog operational circuits.*

*29. The subscriber line interface circuit of claim 25, wherein the mixed signal section is operative to interface voice and ancillary signals including low voltage signaling and ringing signals.*

*30. The subscriber line interface circuit according to claim 25, wherein said high voltage section includes an input signal receiving unit, that is operative to interface and condition said voice and ancillary signals as supplied from said mixed signal section.*

*31. A subscriber line interface circuit, comprising:*

*an analog section, containing analog circuits including tip and ring amplifiers driving tip and ring conductors, respectively having operational parameters thereof established in accordance with respective programmable bias currents supplied thereto by programmable bias current sources coupled to said analog circuits, and to which power sufficient for signaling conditions of said tip and ring conductors of a respective subscriber loop pair is supplied, and being operative to drive said tip and ring conductors of said respective*

*subscriber loop pair in accordance with analog input and analog control signals supplied thereto; and*

*a mixed digital and analog signal section comprising tip and ring sensing circuitry coupled to said tip and ring amplifiers for sensing operational characteristics of said tip and ring amplifiers, respectively, wherein said mixed digital and analog signal section is operative to interface voice and ancillary signals with said analog circuits of said analog section, and to program values of said respective programmable bias currents supplied by said programmable bias current sources, so as to establish said operational parameters of respective ones of said analog circuits of said analog section*

*wherein said analog section includes a control and latch interface unit that is operative to receive and store, from said mixed digital and analog signal section, a plurality of input signals for defining values of said programmable bias currents through which said operational parameters are established.*

*32. The subscriber line interface circuit according to claim 31, wherein said analog section is a high voltage analog section.*

*33. The subscriber line interface circuit of claim 31, wherein the mixed digital and analog signal section comprises a CODEC that is operative to interface said voice and ancillary signals with said analog circuits of said analog section.*

*34. The subscriber line interface circuit of claim 32, wherein the CODEC is a digital signal processor (DSP) based CODEC.*

*35. The subscriber line interface circuit of claim 31, wherein the mixed digital and analog signal section further comprises:*

*a programmable supervisory digital controller; and*

*a feedback connector coupling said tip and ring sensing circuitry to said programmable supervisory digital controller to permit said programmable supervisory digital controller to monitor said operational characteristics.*

*36. The subscriber line interface circuit of claim 35, wherein said programmable digital controller is operable, to program values of said respective programmable bias currents supplied by said programmable bias current sources.*

*37. The subscriber line interface circuit of claim 31, wherein the mixed digital and analog signal section is operative to interface voice and ancillary signals including low voltage signaling and ringing signals.*

* * * * *